United States Patent [19]

Hammer et al.

[11] 4,045,239
[45] Aug. 30, 1977

[54] PROCESS FOR THE PRODUCTION OF THERMOPLASTIC SYNTHETIC MATERIALS AND PLASTIC SHAPING MATERIALS OF CHEMICALLY MODIFIED PROTEIN AND A CHEMICAL PLASTICIZER AND INCLUDING A BISACRYLAMIDE OR BISMETHACRYLAMIDE

[75] Inventors: Klaus-Dieter Hammer, Mainz; Wolfgang Klendauer, Wiesbaden; Max Bytzek, Naurod, all of Germany

[73] Assignee: Hoechst Aktiengesellschaft, Germany

[21] Appl. No.: 619,224

[22] Filed: Oct. 3, 1975

[30] Foreign Application Priority Data

Oct. 7, 1974    Germany ........................ 2447690

[51] Int. Cl.² .................. C08K 11/00; C08L 89/00
[52] U.S. Cl. ..................................... 106/147; 106/124; 106/136; 106/138; 260/8; 260/112 R; 426/105; 426/138
[58] Field of Search .............. 260/8, 112 R; 106/124, 106/138, 147, 136; 426/105, 138

[56] References Cited

U.S. PATENT DOCUMENTS

| | | | |
|---|---|---|---|
| 1,699,245 | 1/1929 | Luther | 260/6 |
| 2,040,033 | 5/1936 | Sturken et al. | 260/8 |
| 2,913,347 | 11/1959 | Pfirrmann | 260/8 X |
| 3,453,222 | 7/1969 | Young | 260/8 |
| 3,583,855 | 6/1971 | Bolinger et al. | 260/8 X |
| 3,936,441 | 2/1976 | Holst et al. | 260/17 X |
| 3,937,672 | 2/1976 | Busch et al. | 260/17.3 |
| 4,001,442 | 1/1977 | Stahlberger et al. | 426/105 |
| 4,002,485 | 1/1977 | Hammer et al. | 106/136 |
| 4,002,710 | 1/1977 | Hammer et al. | 106/147 |

Primary Examiner—Edward M. Woodberry
Attorney, Agent, or Firm—James E. Bryan

[57] ABSTRACT

This invention relates to a process for the production of a thermoplastic synthetic material of chemically modified protein, which comprises mixing an aqueous alkaline protein solution with an aqueous solution of a tetrafunctional, doubly unsaturated, organic compound of the general formula

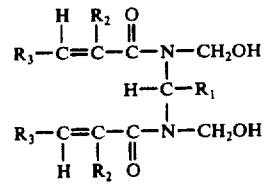

in which
$R_1$ is hydrogen or an alkyl group with 1 to 18 carbon atoms,
$R_2$ is hydrogen or an alkyl group with 1 to 6 carbon atoms, and
$R_3$ is hydrogen or an alkyl group with 1 to 3 carbon atoms, subjecting the mixture to a dwell time, causing a precipitating liquid to act upon it, freeing the formed precipitate from excess liquid, and drying. The invention also relates to a shaping material of plastic material of chemically modified protein and a chemical plasticizer. The invention also relates to a plastic material of modified protein.

19 Claims, No Drawings

PROCESS FOR THE PRODUCTION OF THERMOPLASTIC SYNTHETIC MATERIALS AND PLASTIC SHAPING MATERIALS OF CHEMICALLY MODIFIED PROTEIN AND A CHEMICAL PLASTICIZER AND INCLUDING A BISACRYLAMIDE OR BISMETHACRYLAMIDE

The present invention relates to a process for the production of thermoplastic synthetic materials of chemically modified protein. The invention further relates to a process for the production of shaping materials composed of plastic material for chemically modified protein and a chemical plasticizer.

The present invention further relates to thermoplastic synthetic materials of chemically modified protein and to shaping materials composed of chemically modified protein and a chemical plasticizer.

This invention further relates to the use of plastic material of chemically modified protein and to the use of the shaping material of chemically modified protein and a chemical plasticizer for the production of shaped articles, particularly films and tubes.

This invention further relates to the use of shaped articles, particularly to the use of films and tubes, of plastic materials of chemically modified protein or of shaping materials composed of chemically modified protein and a chemical plasticizer as wrappings.

Artificial horn of casein and formaldehyde is produced according to a process which has been almost unchanged since 1904. According to that process, a paste is made of casein and water, plasticized under pressure at elevated temperatures, and then exposed for a relatively long time to a 4 to 10 per cent by weigh formaldehyde solution. The reaction product is then dried and heated, the casein molecules being linked by methylene bridges. Today, considerable quantities of artificial horn are processed into buttons, combs, trinkets, umbrella handles, piano keys, and similar articles. The known artificial horn has the disadvantage that it is relatively brittle and cannot be plasticized durably by the addition of secondary plasticizers. Tests to improve the property of the known artificial horn by replacing, in its production, formaldehyde by aminoplast procondensates do not lead to a marked improvement of the quality.

The object of the present invention is to provide a process according to which it is possible in a simple manner to produce a plasticized, thermoplastic synthetic material of chemically modified protein, which, compared to the known artificial horn, has the advantage to be durably plasticized, and which process overcomes the disadvantages of the known processes resulting from the fact that the casein plasticized and moulded according to the known processes can be uniformly impregnated with the cross-linking agent only in an extremely unsatisfactory manner.

The present invention provides a process for the production of thermoplastic synthetic materials of chemically modified protein, in which an aqueous alkaline protein solution is mixed with an aqueous solution of a tetrafunctional, doubly unsaturated, organic compound of the general formula

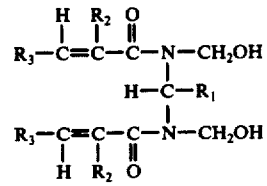

in which
- $R_1$ is hydrogen or an alkyl group with 1 to 18 carbon atoms,
- $R_2$ is hydrogen or an alkyl group with 1 to 6 carbon atoms, and
- $R_3$ is hydrogen or an alkyl group with 1 to 3 carbon atoms, the liquid mixture is stirred, subjected to a swell time, precipitating liquid is then caused to act upon it, the precipitate formed is freed from the excess of liquid, and then dried.

The product formed by the addition of protein molecules to testrafunctional compounds is termed "thermoplastic synthetic material of chemically modified protein".

Suitable tetrafunctional doubly unsaturated, organic compounds are those of the general formula

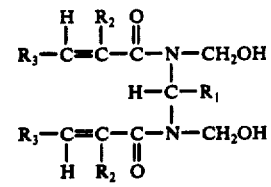

in which
- $R_1$ is hydrogen or an alkyl group with 1 to 18 carbon atoms,
- $R_2$ is hydrogen or an alkyl group with 1 to 6 carbon atoms, and
- $R_3$ is hydrogen or an alkyl group with 1 to 3 carbon atoms.

Particularly suitable is a compound of the above formula in which $R_1$ and $R_3$ are hydrogen and $R_2$ is hydrogen or a methyl group (N-methylol-N,N'-methylenebisacrylamide as well as N-methylol-N,N'-methylenebismethacrylamide).

Suitable chemical plasticizers are the compounds known as plasticizers, e.g. dibutyl adipate, adipic acid butyleneglycol polyester, di-n-hexylphthalate, toluene sulfomethylamide, polyvinyl ether, dioctyl sebacate, dibenzyl sebacate, phthalic acid deithyl ester, di-n-butylphthalate, cylcerol triacetate, hexane trioltriacetate, gylcerol tripropionate, dicyclohexyphthalate, polyglycols, gylcerol triacetate, and similarly acting compounds.

The process is performed by preparing an aqueous alkaline protein solution, e.g. an aqueous ammoniacal solution, and this solution is then mixed with the aqueous solution of a tetrafunctional compound, e.g. the aqueous solution of N-methylol-N,N'-methylene-bisacrylamide, and the mixture is chemically reacted. The reaction in the second reaction phase is accelerated by the addition of catalysts.

The addition product — the plastic material is chemically modified protein — is then precipitated from the reaction liquid by the action of aqueous acid. The precipitate is separated, e.g. by filtering off, and dried, e.g. by the action of warm air. The resulting plastic powder is then mixed with a plasticizer and, with the action of heat and pressure, converted into a shaping material composed of plastic material of chemically modified protein and plasticizer. The performance of the process will be illustrated in detail:

Casein in dissolved in an alkali, preferably in aqueous ammonia, the quantitative ratio of casein to concentrated $NH_4OH$ being in the range from 1 : 0.4 to 1 : 1 by weight. The pH value of the solution is between 8 and 14, preferably between 9 and 12. The casein concentration of the solution is in the range between 3 and 17 per cent by weight, preferably in the range between 6 and 12 per cent by weight, calculated on the total weight of the solution. The solution is defoamed and degassed in known manner and rapidly mixed, with intense stirring, with a 1 to 30 per cent by weight, preferably 3 to 10 per cent by weight, aqueous N-methylol-N,N'-methylene-bisacrylamide solution. The mixture has a temperature in the range between 5° and 40° C, preferably between 20° to 25° C.

The quantity of N-methylol-N,N'-methylene-bisacryklamide is so selected that it is between 2 and 7 per cent by weight, preferably between 2.5 and 6 per cent by weight, calculated on the casein portion in the solution. After the addition of the aqueous N-methylol-N,N'-methylene-bisacrylamide solution to the ammoniacal casein solution, the reaction mixture is subjected to a dwell time of 20 minutes to 12 hours, preferably of 2 to 6 hours, at room temperature.

The reaction product is precipitated from the liquid mixture by stirring in diluted acids, e.g. hydrochloric acid, sulfuric acid, and acetic acid, in a concentration between 3 and 30 per cent by weight, preferably 5 to 15 per cent by weight, calculated on the weight of the acid, filtered, washed, and dried at room temperature or a temperature in the range between 30° and 60° C. By means of known devices for processing thermoplasts, e.g. extruders, calenders, and injection moulding machines, the powder of thermoplastic synthetic material can be processed in known manner into shaped articles, such as films or tubes.

The plastic material is then finely pulverized, a paste is made with 3 to 40 percent by weight, preferably 5 to 20 percent by weight, of a known plasticizer, e.g. gylcerol triacetate or polyglycol, and, with the action of heat and pressure, converted into a shaping material. After cooling, this shaping material can be converted in known devices into the form of a granulate. The shaping material granulate can be processed in known manner by means of conventional devices for processing thermoplastic synthetic materials or shaping materials based on thermoplastic synthetic materials, e.g. by extrusion, calendering or injection moulding.

The invention will be further illustrated by reference to the following specific examples:

EXAMPLE 1

80 g of casein (70.3 g of pure milk protein) are uniformly distributed in 589 ml of water, well swollen and dissolved with 34 ml of concentrated $NH_4OH$ (25 percent). 29 ml of a 5 percent (2.8 percent, calculated on milk protein) aqueous solution of N-methylol-N,N'-methylene-bisacrylamide are rapidly added with stirring at 20° C. After a dwell time of 2 hours at room temperature, the reaction mixture has a falling-ball viscosity of 110 seconds.

With intense stirring, the liquid is then slowly poured into 700 ml of 15 per cent aqueous sulfuric acid, the modified casein being precipitated as a weakly yellow precipitate. This precipitate is filtered off, thoroughly washed with water, until the filtrate has a neutral reaction, dried, and then finely ground. A paste is then made with the powder and 12 percent by weight of polyglycol 400, calculated on the weight of the plastic material, and moulded into a plate during 30 minutes at 140° C under a supeatmospheric pressure of 70 kg/cm². The material forming the plate has a density of 1.31 g/cm³. The plate can be processed in known manner into a granulate.

In known apparatuses for processing thermoplastic materials, e.g. by means of extruders, calenders or injection moulding machines, the granulate can be converted into shaped articles, e.g. films or hollow bodies.

The formed plastic material or the shaping material of plastic material and plasticizer has a thermoplastic character.

EXAMPLE 2

As in Example 1 but with the exception that the plastic material powder is mixed with 20 percent by weight of glycerol triacetate and converted in a mould under a superatmospheric pressure of 30 kg/cm², at a temperature of 150° C, during 45 minutes into a flexible, transparent shaped article of plastic material which has a density of 1.30 g/cm³.

It will be obvious to those skilled in the art that many modifications may be made within the scope of the present invention without departing from the spirt thereof, and the invention includes all such modifications.

What is claimed is:

1. A process for the production of a thermoplastic synthetic material of chemically modified casein, which comprises mixing an aqueous alkaline casein solution with an aqueous solution of a tetrafunctional, doubly unsaturated, organic compound of the general formula

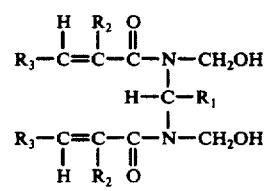

in which

R₁ is hydrogen or an alkyl group with 1 to 18 carbon atoms,

R₂ is hydrogen or an alkyl group with 1 to 6 carbon atoms, and

R₃ is hydrogen or an alkyl group with 1 to 3 carbon atoms, subjecting the mixture to a dwell time, causing a precipitating liquid to act upon it, freeing the formed precipitate from excess liquid, and drying.

2. A process according to claim 1 in which the tetrafunctional, doubly unsaturated, organic compound is N-methylol-N,N'-methylene-bisacrylamide or N-methylol-N,N'-methylene-bismethacrylamide.

3. A process according to claim 1 in which the liquid mixture is stirred at a temperature in the range of about 60 to 90° C.

4. A process according to claim 1 in which the liquid mixture is subjected to a dwell time of 2 to 6 hours.

5. A process according to claim 1 in which the precipitating liquid is an aqueous acid.

6. A process according to claim 1 in which the liquid mixture contains a chemical catalyst.

7. A process according to claim 1 in which the liquid mixture contains about 2.5 to 6 percent by weight of N-methylol-N,N'-methylene-bisacrylamide or N-methylol-N,N'-methylene-bismethacrylamide, calculated on the total weight of the casein in the solution.

8. A process for the production of a shaping material of plastic material of chemically modified casein and a chemical plasticizer, which comprises mixing an aqueous alkaline casein solution with an aqueous solution of a tetrafunctional, doubly unsaturated, organic compound of the general formula $$\begin{array}{c} \text{H} \quad \text{R}_2 \quad \text{O} \\ | \quad | \quad \| \\ \text{R}_3\text{—C=C—C—N—CH}_2\text{OH} \\ | \\ \text{H—C—R}_1 \\ | \\ \text{R}_3\text{—C=C—C—N—CH}_2\text{OH} \\ | \quad | \quad \| \\ \text{H} \quad \text{R}_2 \quad \text{O} \end{array}$$

in which
 $R_1$ is hydrogen or an alkyl group with 1 to 18 carbon atoms,
 $R_2$ is hydrogen or an alkyl group with 1 to 6 carbon atoms, and
 $R_3$ is hydrogen or an alkyl group with 1 to 3 carbon atoms, subjecting the mixture to a dwell time, causing a precipitating liquid to act upon it, freeing the formed precipitate from excess liquid, drying, mixing it with a chemical plasticizer, and subjecting the mixture to heat and pressure.

9. A process according to claim 8 in which the tetrafunctional, doubly unsaturated, organic compound is N-methylol-N,N'-methylene-bisacrylamide or N-methylol-N,N'-methylene-bismethacrylamide.

10. A process according to claim 8 in which the chemical plasticizer is dibutylhthalate.

11. A film or tube of a plastic material produced according to claim 1.

12. A film or tube of a shaping material produced according to claim 8.

13. A plastic material of modified casein comprising a chemical compound obtained by mixing an aqueous alkaline casein solution and an aqueous solution of a tetrafunctional, doubly unsaturated, organic compound of the general formula $$\begin{array}{c} \text{H} \quad \text{R}_2 \quad \text{O} \\ | \quad | \quad \| \\ \text{R}_3\text{—C=C—C—N—CH}_2\text{OH} \\ | \\ \text{H—C—R}_1 \\ | \\ \text{R}_3\text{—C=C—C—N—CH}_2\text{OH} \\ | \quad | \quad \| \\ \text{H} \quad \text{R}_2 \quad \text{O} \end{array}$$

in which
 $R_1$ is hydrogen or an alkyl group with 1 to 18 carbon atoms,
 $R_2$ is hydrogen or an alkyl group with 1 to 6 carbon atoms, and
 $R_3$ is hydrogen or an alkyl group with 1 to 3 carbon atoms, subjecting the mixture to a dwell time, causing a precipitating liquid to act upon the liquid mixture, and drying the precipitated product.

14. A plastic material according to claim 13 in which the tetrafunctional, doubly unsaturated, organic compound is N-methylol-N,N'-methylene-bisacrylamide or N-methylol-N,N'-methylene-bismethacrylamide.

15. A film of plastic material according to claim 13.

16. A tube of plastic material according to claim 13.

17. A shaping material composed of plastic material according to claim 13 and a chemical plasticizer.

18. A tube of shaping material according to claim 17.

19. A film of shaping material according to claim 17.

* * * * *